(12) United States Patent
Lemieux

(10) Patent No.: US 6,851,528 B2
(45) Date of Patent: Feb. 8, 2005

(54) SHOCK ABSORBER WITH ADJUSTABLE VALVING

(75) Inventor: René Lemieux, Granby (CA)

(73) Assignee: Bombardier Recreational Products Inc., Valcourt (CA)

(*) Notice: Subject to any disclaimer, the term of this patent is extended or adjusted under 35 U.S.C. 154(b) by 0 days.

(21) Appl. No.: 10/282,250

(22) Filed: Oct. 29, 2002

(65) Prior Publication Data

US 2003/0085087 A1 May 8, 2003

Related U.S. Application Data

(60) Provisional application No. 60/330,699, filed on Oct. 29, 2001.

(51) Int. Cl.[7] .................................................. F16F 9/34
(52) U.S. Cl. ................ 188/322.14; 188/285; 188/266.6
(58) Field of Search ....................... 188/322.14, 322.15, 188/285, 314, 315, 266.6, 266

(56) References Cited

U.S. PATENT DOCUMENTS

| | | | | | |
|---|---|---|---|---|---|
| 4,346,794 A | * | 8/1982 | Smeltzer | ................ | 188/322.14 |
| 4,752,062 A | * | 6/1988 | Domenichini | .......... | 188/322.14 |
| 5,301,776 A | * | 4/1994 | Beck | ..................... | 188/322.13 |
| 5,464,079 A | * | 11/1995 | Lohberg et al. | ........ | 188/322.14 |
| 5,542,509 A | | 8/1996 | Bell | | |
| 5,890,568 A | * | 4/1999 | De Kock et al. | ........ | 188/266.5 |
| 6,290,035 B1 | * | 9/2001 | Kazmirski et al. | ..... | 188/322.14 |

* cited by examiner

Primary Examiner—Matthew C. Graham
(74) Attorney, Agent, or Firm—BRP Legal Services

(57) ABSTRACT

A shock absorber includes a shock rod and piston which are disposed within a fluid chamber within a shock body. The piston separates the shock body fluid chamber into a compression fluid chamber and a rebound fluid chamber. A reservoir fluid chamber accommodates the entry of the shock rod into the fluid chamber as the shock absorber compresses under shock forces. The compression fluid chamber is in fluid communication with the reservoir fluid chamber through a third chamber or passage. A first valve may control passage of fluid from the compression fluid chamber into the passage. Second and third valves may be disposed within the passage in parallel with each other and in series with the first valve. The third valve may include an easily accessible knob disposed outside the shock body.

4 Claims, 2 Drawing Sheets

SHOCK ABSORBER WITH ADJUSTABLE VALVING

This application claims priority to U.S. application Ser. No. 60/330,699, filed Oct. 29, 2001, the entire contents of which are incorporated herein by reference.

FIELD OF THE INVENTION

The field of the present invention relates to shock absorbers that include a piston and shock rod assembly that move within a fluid containing shock housing.

BACKGROUND OF THE INVENTION

Shock absorbers are widely used in the suspension systems of recreational vehicles such as snowmobiles and all terrain vehicles. Shock absorbers dampen shocks experienced when the recreational vehicle travels over rough terrain. Shock absorbers are typically mounted between a vehicle component that moves in relation to the chassis and the chassis itself. Shock absorbers are often used in combination with a spring assembly which may or may not be integrated with the shock absorber. In a snowmobile, shock absorbers are typically positioned between the chassis and the slide frame around which an endless track rotates to propel the vehicle. The shock absorber(s) allow the slide frame to compress towards the chassis at a controlled rate. In the case of an all terrain vehicle, the shock absorbers are typically positioned between a wheel assembly and the chassis. The shock absorber(s) allow the wheel assembly to compress towards the chassis at a controlled rate.

Shock absorbers typically have a shock body having a cylindrical wall sealed between first and second end caps creating a chamber in which a fluid is contained. The interior of the shock body is separated into two sections by a piston, which moves within the fluid. Shock absorbers typically include a shock rod having a first end attached to the piston, defining a shock rod/piston assembly, and a second end attached to the vehicle frame or chassis. Normally the shock rod is attached to the vehicle chassis through a rod eye. The first end cap, which is typically at the bottom of the shock body includes a mounting structure suitable for coupling to a vehicle component that moves in relation to the chassis. In the case of a snowmobile, the end cap is coupled to the slide frame. In the case of an all terrain vehicle, the end cap is coupled to a frame component. The shock rod extends through the second end cap of the shock body which is named the "rod-eye end cap." The rod-eye end cap is typically disposed at the top of the shock body.

For the piston to move within the shock body, the fluid within the fluid-filled chamber of the shock body must travel through the piston. Therefore, passages are formed through the piston to control the fluid flow between each section of the shock body. The passages are typically aligned with the longitudinal axis of the piston. The openings of some of these passages may be covered with leaf valves while the remainder of the openings may be uncovered to thus serve as by-pass passages. The only restriction in the by-pass passages is the viscosity of the fluid itself and the diameter of the passages.

The shock rod/piston assembly and the shock body (which includes the cylindrical wall and both of the end caps) move in relation to one another upon the application of forces to the shock absorber. The relative movement between the shock rod/piston assembly and the shock body results in the movement of the piston through the fluid, which provides the hydraulic damping for the shock absorber. Therefore, the shock forces that are applied to the vehicle component to which the shock absorber is coupled are at least partially absorbed by the shock absorber. Accordingly, the shock forces that are applied to the vehicle frame or chassis are dampened by the shock absorber.

The movement of the shock rod/piston assembly within the fluid-filled chamber of the shock body occurs in two stages, a compression stage followed by a rebound stage, both of which are described in greater detail below.

As the vehicle runs over rough terrain, shock forces are applied to the vehicle component to which the shock absorber is mounted. These shock forces cause the vehicle component to move from a steady state position to one where the vehicle component has compressed relative to the chassis. Since the shock absorber is disposed between the vehicle component and the chassis, as the components move toward one another, the shock absorber compresses. This is called the compression stage of the shock absorber. As the shock absorber compresses, the shock rod/piston assembly moves inwardly relative to the shock body, within the fluid-filled chamber of the shock body. As a result, the piston moves within the fluid-filled chamber of the shock body toward the first end cap. During this compression stage, the shock absorber slows or dampens the rate at which the vehicle component compresses toward the chassis.

The rebound stage follows the compression stage. The rebound stage results from the resilient expansion of the spring associated with the shock absorber, which pushes the vehicle component away from the vehicle chassis to the original steady state position. The force exerted by the spring is usually quite low by comparison with the compressive force, because, in the rebound stage, the force of the spring only needs to be high enough to overcome the combined weight of the vehicle and the rider. This spring force causes the shock absorber to extend, resulting in the shock rod/piston assembly extending outwardly relative to the shock body. The piston moves within the fluid-filled chamber away from the first end cap toward the second or "rod eye" end cap. As was the case during the compression stage, the shock absorber slows or dampens the rate at which the vehicle component may move relative to the chassis during the rebound stage.

During the compression stage, the shock rod/piston assembly moves inwardly within the shock body toward the shock body first end cap. Accordingly, the shock rod displaces a volume of fluid within the shock body that is equal to the volume of the shock rod that has extended into the shock body. To accommodate this displacement of fluid, a reservoir is typically used in association with the shock absorber. As fluid within the shock body fluid-filled chamber is displaced by the shock rod, the volume of fluid in the reservoir increases a corresponding amount. During the rebound stage, the shock rod/piston assembly moves outwardly from the shock body away from the shock body first end cap. Accordingly, the fluid within the reservoir that was displaced by the shock rod during the compression stage re-enters the shock body.

In some shock absorbers, a valve separates the shock body fluid-filled chamber from the reservoir. The valve controls the rate at which fluid may pass from the shock body fluid-filled chamber to the reservoir, and/or the rate at which fluid may pass from the reservoir back to the shock body fluid-filled chamber. In some instances, the valve may restrict the movement of fluid to a single direction between the shock body fluid-filled chamber and the reservoir. In this situation, the shock absorber must include a structure through which the fluid may move in the opposite direction between the shock body fluid-filled chamber and the reservoir. A second valve may be used for this purpose. A valve that controls the flow of fluid from the shock body fluid-filled chamber to the reservoir is usually called a compression valve. A valve that controls the flow of fluid from the reservoir to the shock body fluid-filled chamber is usually referred to as a rebound valve.

In some prior art shock absorber designs, both of these valves are adjustable. By controlling the rate at which fluid may pass from the shock body fluid-filled chamber to the reservoir, or vice versa, the valves control the rate at which the shock rod moves in relation to the shock body. As the fluid in the shock body fluid-filled chamber is incompressible, the shock rod can enter the shock body only at substantially the same rate at which the volume of the shock rod displaces fluid from the shock body fluid-filled chamber into the reservoir. Obviously, if the rate at which the fluid may be displaced is changed, then the rate at which the shock rod may move in relation to the shock body will be changed to a corresponding amount.

Many prior art shock absorbers fail to provide sufficient adjustment to the rate at which fluid is permitted to pass through the compression and rebound valves. Such inadequacies may result from the incorporation of valves with too small an adjustment range. Other prior art shock absorbers provide no adjustment. Still others provide adequate adjustment by providing an adjustment knob or selector, but the adjustment knob or selector is positioned such that it is largely inaccessible (or not conveniently accessible) to the vehicle operator.

When provided, compression and rebound valves are typically disposed on the shock absorber at a location adjacent to the shock body first end cap. Accordingly, an adjustment knob or selector typically is disposed at this position on the shock absorber. The first end cap usually includes a mounting structure such as an eye that is used to attach the shock absorber to a movable vehicle component. Accordingly, the adjuster knob or selector often is placed in close proximity to the movable vehicle component in a position the operator may find difficult to access. In these shock absorber designs, the adjustment feature is of little use because the user will likely disregard a feature that is not convenient to use.

Some shock absorber designs use a reservoir that is open to the atmosphere through a vent hole. In these shock absorber designs, if the pressure of the fluid that enters the reservoir is high and cannot be modulated, the fluid may be undesirably discharged from the shock absorber through the vent hole. This undesirable discharge is known as leakage and results in diminished shock absorber performance. It may also have the undesirable effect of covering vehicle parts with shock absorber fluid.

A need, therefor, has developed for a shock absorber that maximizes the ease with which an adjustment may be made to the rate at which the shock rod may move in relation to the shock body. A need has also developed for a shock absorber that maximizes the extent to which an adjustment may be made to the rate at which the shock rod may move in relation to the shock body. A need has also developed for a shock absorber that includes a vent to the atmosphere, but which minimizes the possibility that shock fluid may be undesirably discharged from the shock absorber to the ambient environment. The prior art does not address these aforementioned needs.

SUMMARY OF THE INVENTION

It is, therefore, an object of the present invention to provide a simple, cost-effective, reliable, shock absorber with improved characteristics.

It is another object of the present invention to provide a shock absorber that maximizes the ease with which an adjustment may be made to the rate at which the shock rod moves in relation to the shock body.

It is still another object of the present invention to provide a shock absorber that maximizes the extent to which an adjustment may be made to the rate at which the shock rod moves in relation to the shock body.

It is yet another object of the present invention to provide a shock absorber that minimizes the possibility that shock fluid may be undesirably discharged from the shock absorber through a vent hole or other aperture opening to the environment.

In furtherance of these objects, one aspect of the present invention is to provide a shock absorber having a shock rod having a longitudinal axis, a first end, and a second end. A shock body is disposed around the first end of the shock rod. The shock body defines a fluid chamber. The shock body is slidable along the shock rod longitudinal axis. The shock body has a first end and a second end. The shock rod extends through the shock body second end such that the shock rod second end is disposed outside the shock body. A piston is disposed on the first end of the shock rod in sealing engagement with the shock body. The piston has at least one channel therethrough in communication with the fluid chamber. The piston separates the shock body fluid chamber into a first fluid chamber and a second fluid chamber. The first fluid chamber is disposed between the shock body first end and the piston, the second fluid chamber is disposed between the shock body second end and the piston. The shock absorber further includes a third fluid chamber in fluid communication with the first fluid chamber, and a fourth fluid chamber in communication with the third fluid chamber. The fourth fluid chamber has a volume sufficient to accommodate fluid displaced by the shock rod. The shock absorber further includes a first outlet through which fluid may pass between the first fluid chamber and the third fluid chamber, a second outlet through which fluid may pass at least in the direction from the third fluid chamber to the fourth fluid chamber, and a third outlet through which fluid may pass at least in the direction from the third fluid chamber to the fourth fluid chamber.

Another aspect of the present invention is to provide a shock absorber having a shock rod having a longitudinal axis, a first end, and a second end. A shock body is disposed around the first end of the shock rod. The shock body defines a fluid chamber. The shock body is slidable along the shock rod longitudinal axis. The shock body has a first end and a second end. The shock rod extends through the shock body second end such that the shock rod second end is disposed outside the shock body. A piston is disposed on the first end of the shock rod in sealing engagement with the shock body. The piston has at least one channel therethrough in communication with the fluid chamber. The piston separates the shock body fluid chamber into a first fluid chamber and a second fluid chamber. The first fluid chamber is disposed between the shock body first end and the piston, the second fluid chamber is disposed between the shock body second end and the piston. The shock absorber further includes a reservoir fluid chamber in fluid communication with the first fluid chamber. The reservoir fluid chamber has a sufficient volume to accommodate fluid displaced by the shock rod. The shock absorber further includes at least one passage through which fluid may pass from the first fluid chamber to the reservoir fluid chamber. A first valve is disposed within the passage through which fluid may pass from the first fluid chamber to the reservoir fluid chamber. A second valve is also disposed within the passage through which fluid may pass from the first fluid chamber to the reservoir fluid chamber. The second valve is disposed in series with the first valve such that fluid must pass through the first valve before passing through the second valve.

Still, another aspect of the present invention is to provide a shock absorber having a shock rod having a longitudinal axis, a first end, and a second end. A shock body is disposed around the first end of the shock rod. The shock body defines a fluid chamber. The shock body is slidable along the shock rod longitudinal axis. The shock body has a first end and a second end. The shock rod extends through the shock body second end such that the shock rod second end is disposed outside the shock body. A piston is disposed on the first end of the shock rod in sealing engagement with the shock body. The piston has at least one channel therethrough in communication with the fluid chamber. The piston separates the shock body fluid chamber into a first fluid chamber and a second fluid chamber. The first fluid chamber is disposed between the shock body first end and the piston, the second fluid chamber is disposed between the shock body second end and the piston. The shock absorber further includes a reservoir fluid chamber in fluid communication with the first fluid chamber, the reservoir fluid chamber having a volume sufficient to accommodate fluid displaced by the shock rod. The shock absorber includes a first valve permitting fluid to pass therethrough, at least in the direction from the first fluid chamber to the reservoir fluid chamber. The first valve is moveable between an opened position where fluid may pass from the first fluid chamber to the reservoir fluid chamber, to a closed position where fluid is restricted from passing from the first fluid chamber to the reservoir fluid chamber. The first valve includes a manual adjuster. The shock body fluid chamber includes a cylindrical peripheral wall. The reservoir includes a cylindrical peripheral wall disposed around the shock body fluid chamber cylindrical peripheral wall in spaced relation thereto. The manual adjuster extends outwardly from the reservoir cylindrical peripheral wall.

The foregoing objects are not meant to limit the scope of the present invention. To the contrary, still other objects of the present invention will become apparent from the description that follows.

BRIEF DESCRIPTION OF THE DRAWINGS

Reference will be made herein after to the accompanying drawings, which illustrate embodiments of the present invention discussed herein below, wherein.

DETAILED DESCRIPTION OF THE PREFERRED EMBODIMENTS

Figure 1:
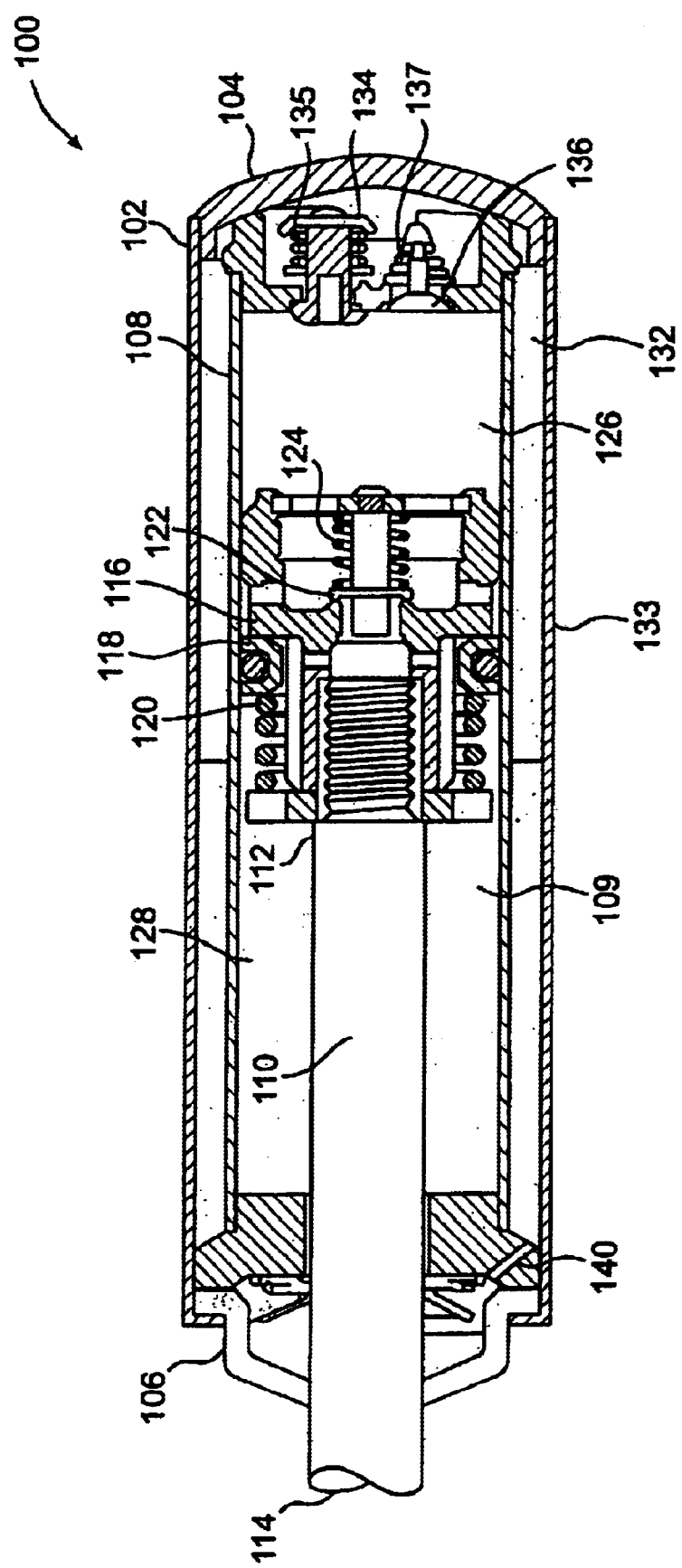
FIG. 1 is a cross sectional side view of a prior art shock absorber.

FIG. 1 is a cross-sectional side view of a prior art shock absorber 100. The shock absorber 100 includes a shock body 102 having a first end 104 and a second end 106. The shock body 102 includes a first peripheral wall 108, which is typically cylindrical. The first end 104, second end 106, and peripheral wall 108 define a shock body fluid chamber 109, within which a shock absorber fluid is disposed. The shock absorber includes a shock rod 110 having a longitudinal axis, a first end 112 disposed within the shock body fluid chamber 109, and a second end 114 extending from the shock body second end 106 to a location where the second end is disposed outside the shock body 102. Although not shown, it is understood that the shock rod second end 114 would typically include a rod eye or other structure suitable for connecting the shock rod 110 to a vehicle.

A piston 116 is disposed on the shock rod first end 112 in sealing engagement with the shock body peripheral wall 108. The piston 116 includes a compression valve 118, which is biased by spring 120, and a rebound valve 122, which is biased by spring 124. The piston 116 separates the shock body fluid chamber 109 into a first fluid chamber 126, which is a compression chamber, and a second fluid chamber 128, which is a rebound chamber. The first fluid chamber 126 is disposed between the shock body first end 104 and the piston 116, the second fluid chamber 128 is disposed between the shock body second end 106 and the piston 116.

The prior art shock absorber 100 further includes a reservoir fluid chamber 132 disposed outside the shock body fluid chamber 109. A second peripheral wall 133 is disposed outside the first peripheral wall 108. The volume between the second peripheral wall 133 and the first peripheral wall 108 is the reservoir fluid chamber 132. The first fluid chamber (compression chamber) 126 is in fluid communication with the reservoir fluid chamber 132 through valves 134 and 136. Compression valve 134 allows fluid movement in the direction from the first fluid chamber (compression chamber) 126 to the reservoir fluid chamber 132. The compression valve 134 is spring biased through a compression spring 135. Rebound valve 136 allows fluid movement in the direction from the reservoir fluid chamber 132 to the first fluid chamber (compression chamber) 126. The rebound valve 136 is spring biased through a compression spring 137.

In use, the prior art shock absorber 100 compresses under shock forces. The shock rod 110 and piston 116 move relative to the shock body 102 in unison within the shock body fluid chamber 109. The shock rod 110 and piston 116 move in two distinct stages.

In a first stage, which is a compression stage, the shock rod 110 and piston 116 compress toward the shock body first end 104. During this compression stage, shock fluid within the shock body fluid chamber 109 moves through the compression valve 134 into the reservoir 132, so that a greater length of the shock rod 110 can be accommodated within the fluid chamber 109. The amount of fluid that moves through the compression valve 134 is equal to the volume of the shock rod entering the shock body fluid chamber 109. If the compression force is sufficient, shock fluid may undesirably escape from the reservoir through the vent hole 140.

In a second stage, which is a rebound stage, the shock rod 110 and piston 116 extend away from the shock body first end 104. During this rebound state, shock fluid within the reservoir fluid chamber 132 moves through the rebound valve 136 back into the shock body fluid chamber 109. The rebound stage results from a force exerted on the shock absorber by an external spring (not shown) that is a component of a vehicle suspension system.

As may be apparent from the illustration of the shock absorber 100, the compression valve 134 and the rebound valve 136 are sealed within the interior of the shock absorber. In particular, the shock body first end 104 completely covers both valves 134, 136, making them inaccessible to the operator of the recreational vehicle.

Figure 2:
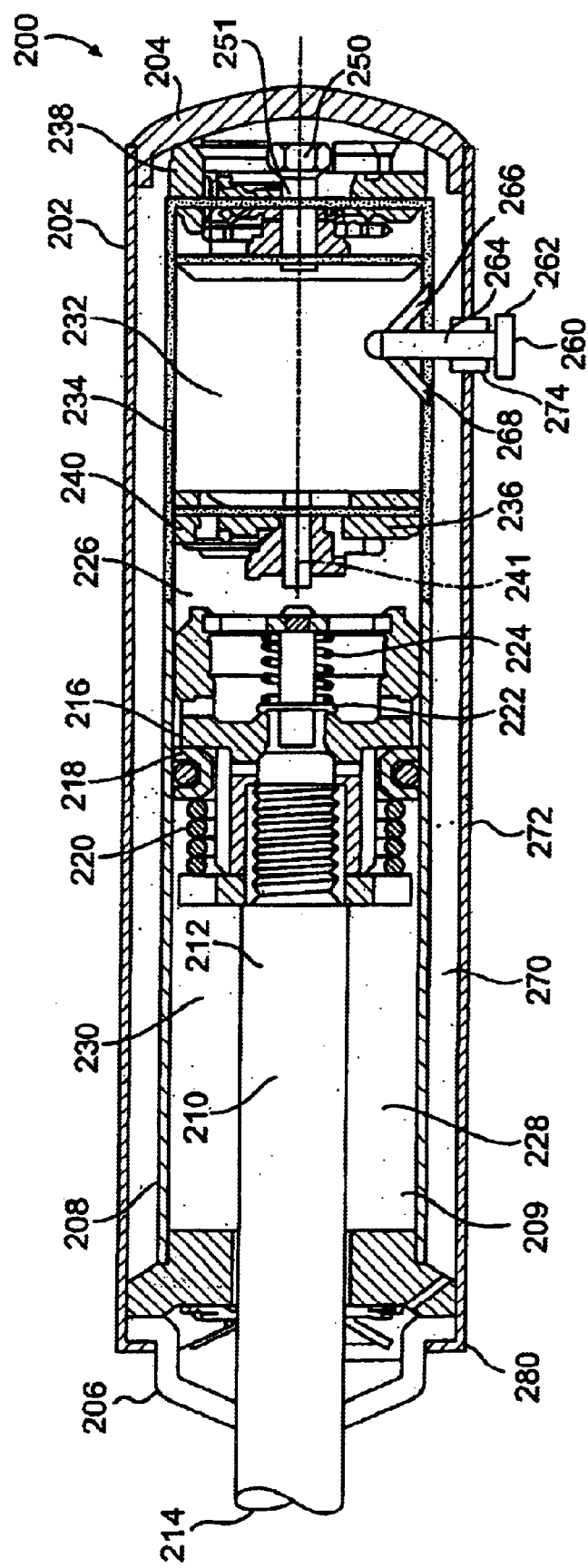
FIG. 2 is a cross sectional side view of an embodiment of the shock absorber constructed in accordance with the teachings of the present invention.

FIG. 2 is a side view in cross-section of the shock absorber 200 of the present invention. The shock absorber 200 includes a shock body 202 having a first end 204 and a second end 206. The shock body 202 includes a first peripheral wall 208, which is preferably cylindrical. The first end 204, second end 206, and peripheral wall 208 define a shock body fluid chamber 209, within which a shock absorber fluid is disposed. The shock absorber 200 includes a shock rod 210 having a longitudinal axis, a first end 212 disposed within the shock body fluid chamber 209, and a second end 214 extending from the shock body second end 206 to a location where the second end is disposed outside the shock body 202. Although not shown, it is understood that the shock rod second end 214 would typically include a rod eye or other structure suitable for connecting the shock rod 210 to a vehicle.

A piston 216 is disposed on the shock rod first end 212 in sealing engagement with the first peripheral wall 208. The piston 216 includes a compression valve 218, which is biased by spring 220 and a rebound valve 222, which is biased by spring 224. The piston 216 separates the shock body fluid chamber 209 into a first fluid chamber 226, which is a compression chamber, and a second fluid chamber 228, which is a rebound chamber. The first fluid chamber 226 is disposed between the shock body first end 204 and the piston 216, the second fluid chamber 228 is disposed between the shock body second end 206 and the piston 216.

The shock absorber 200 further includes a third fluid chamber 232 in fluid communication with the first fluid chamber 226. The third fluid chamber 232 is enclosed by a second peripheral wall 234 disposed between a first end plug 236 and a second end plug 238. The third fluid chamber 232 is an intermediate chamber or passage through which the shock fluid must pass from the first fluid chamber 226 to a reservoir fluid chamber 270, which is the fourth fluid chamber of the shock absorber 200.

A valve 240 separates the third fluid chamber 232 from the first fluid chamber 226. The valve 240 is disposed within an outlet 241, through which the shock fluid passes between the first fluid chamber 226 and the third fluid chamber 232, and vice versa. The valve 240 is moveable between an open position where fluid may pass from the first fluid chamber 226 to the third fluid chamber 232, to a closed position where fluid is restricted from passing from the first fluid chamber 226 to the third fluid chamber 232. The valve 240 is also moveable between an open position where fluid may pass from the third fluid chamber 232 to the first fluid chamber 226, to a closed position where fluid is restricted from passing from the third fluid chamber 232 to the first fluid chamber 226.

A valve 250 separates the third fluid chamber 232 from the reservoir fluid chamber 270. The valve 250 is disposed within an outlet 251, through which the shock fluid passes between the third fluid chamber 232 and the reservoir fluid chamber 270, and vice versa. The valve 250 is moveable between an open position where fluid may pass from the third fluid chamber 232 to the reservoir fluid chamber 270, to a closed position where fluid is restricted from passing from the third fluid chamber 232 to the reservoir fluid chamber 270. The valve 250 is also moveable between an open position where fluid may pass from the reservoir fluid chamber 270 to the third fluid chamber 232, to a closed position where fluid is restricted from passing from the reservoir fluid chamber 270 to the third fluid chamber 232. The valve 250 also is adjustable to permit fluid to pass, at variable rates, from the reservoir fluid chamber 270 to the fluid chamber 232 and vice versa.

Additionally, an adjustable valve 260 separates the third fluid chamber 232 from the reservoir fluid chamber 270. The valve 260 is disposed within outlet passages 266 and 268, through which the shock fluid passes between the third fluid chamber 232 and the reservoir fluid chamber 270, and vice versa. The valve 260 is moveable between an open position where fluid may pass from the third fluid chamber 232 to the reservoir fluid chamber 270, to a closed position where fluid is restricted from passing from the third fluid chamber 232 to the reservoir fluid chamber 270. The valve 260 is also moveable between an open position where fluid may pass from the reservoir fluid chamber 270 to the third fluid chamber 232, to a closed position where fluid is restricted from passing from the reservoir fluid chamber 270 to the third fluid chamber 232. The valve 260 also is adjustable to permit fluid to pass, at variable rates from the reservoir fluid chamber 270 and the third fluid chamber 232 and vice versa.

The valve 260 is disposed on the shock body 102 at a distance from the shock body first end 204 so as to be fully accessible to the operator of the vehicle. The valve 260 is adjustable via a manual adjuster 262, such as by a knob, manually adjustable by a person's fingers, or by a adjuster, engageable by a screwdriver or other suitable tool and manually adjustable thereby. The valve shaft 264 is disposed within a fitting 274 that allows the shaft 264 to be selectively positioned within the fitting 274. The mechanical connection between the valve shaft 264 and the fitting 274 would preferably be performed with threads, although other mechanical connections are possible. This selective positioning of the valve 260 allows the user to select the desired operation of the valve 260 by selectively determining the position of the shaft 264 relative to the outlet passages 266 and 268. The valve shaft 264 may be positioned within a range from first position where both outlet passages 266 and 268 are open to a second position where both outlet passages 266 and 268 are closed. The valve shaft 264 also may be positioned such that the passages 266, 268 are partially opened.

The reservoir fluid chamber 270 is disposed outside the shock body fluid chamber 209. A peripheral wall 272 is disposed outside the peripheral wall 208. The area between the third peripheral wall 272 and the first peripheral wall 208 is the reservoir fluid chamber. The reservoir fluid chamber 270 is vented to the atmosphere through the vent outlet 280.

In use, the shock absorber 200 compresses under shock forces. The shock rod 210 and piston 216 move relative to the shock body 202 in unison within the shock body fluid chamber 209. The shock rod 210 and piston 216 move in two distinct stages.

In a first stage, which is a compression stage, the shock rod 210 and piston 216 compress toward the shock body first end 204. During this compression stage, shock fluid within the shock body fluid chamber 209 moves through the passage 241 and the valve 240 into the third fluid chamber 232. The passage of shock fluid into the third chamber 232 causes shock fluid within the third fluid chamber 232 to be displaced into the reservoir fluid chamber 270. The displacement of fluid from the third fluid chamber 232 into the reservoir fluid chamber 270 equals the volume of the shock rod entering the shock body fluid chamber 209.

During the compression stage, shock fluid passes from the third fluid chamber 232 into the reservoir fluid chamber 270 through the outlet 251, within which valve 250 is disposed. Additionally, depending on the position of the valve 260, the fluid within the third fluid chamber 232 may also pass from the third fluid chamber 232 into the reservoir fluid chamber 270 through the outlet passages 266 and 268, which are selectively opened and closed by the valve 260. The degree to which the valve 260 is open determines the rate at which shock fluid may pass through the passages 266 and 268. As the degree to which the outlet passages 266 and 268 are open increases, the rate at which the shock rod 210 passes into the shock body 202 also increases. Accordingly, the user may have considerable influence on the performance of the shock absorber 200 in the compression stage. Should the user desire a setting where the shock compresses at a faster rate, the user need only adjust the valve 260 to a more opened position. Should the user desire a setting where the shock compresses at a slower rate, the user need only adjust the valve 260 to a new more closed position. As the valve 260 is accessible through the side of the shock body 202, such adjustments to the shock absorber 200 are convenient to the user.

In a second stage, which is a rebound stage, the shock rod 210 and piston 216 extend away from the shock body first end 204. During this rebound stage, shock fluid within the reservoir fluid chamber 232 moves back into the third fluid chamber 232. The rebound stage results from a force exerted on the shock absorber by an external spring (not shown) that is a component of a vehicle suspension system.

In the rebound stage, the shock fluid passes from the reservoir fluid chamber 270 into the third fluid chamber 232 through the outlet 251 within which valve 250 is disposed. Additionally, depending on the position of the valve 260, the fluid within the reservoir fluid chamber 270 may also pass from the reservoir fluid chamber 270 into the third fluid chamber 232 through the outlet passages 266 and 268, which are selectively opened and closed by the valve 260. The degree to which the valve 260 is opened determines the rate at which shock fluid may pass through the passages 266 and 268. As the degree to which the outlet passages 266 and 268 are opened increases, the rate at which the shock re-extends after compressing also is increased. Accordingly, the user may have considerable influence on the performance of the shock absorber 200 in the rebound stage.

Although not shown, the valve 240 and the valve 250 also could be adjustable. It is also understood that any adjustable valve used in the present invention could be adjusted electronically, for example through the use of a solenoid.

The shock absorber 200 of the present invention minimizes the possibility that shock fluid may be undesirably discharged from the shock absorber through the vent outlet 290. This is because the shock absorber 200 includes an additional fluid chamber 232 or passage through which the shock fluid must pass before passing into the reservoir fluid chamber 270, and because of the inclusion of the valves 240, 250, and 260 that control the passage of shock fluid into and out of the chamber 232. There is little chance that shock fluid could enter reservoir fluid chamber 270 with sufficient pressure to allow it to exit the vent outlet 280.

The shock absorber of the present invention is preferably made from steel or aluminum and has a circular cross-sectional shape. However, as would be known to one skilled in the art, the shock absorber could be made in any shape and from any suitable material(s) capable of withstanding shocks experienced in the environment in which the shock absorber is designed to operate.

While the invention has been described with reference to several preferred embodiments, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed:

1. A shock absorber, comprising:
   a shock rod having a longitudinal axis, a first end, and a second end;
   a shock body disposed around the first end of the shock rod, the shock body defining a fluid chamber therein and being slidable along the shock rod longitudinal axis, the shock body having a first end and a second end, the shock rod extending through the shock body second end such that the shock rod second end is disposed outside the shock body;
   a piston disposed on the first end of the shock rod in sealing engagement with the shock body, the piston having at least one channel therethrough in communication with the fluid chamber, the piston separating the shock body fluid chamber into a first fluid chamber and a second fluid chamber, the first fluid chamber being disposed between the shock body first end and the piston, the second fluid chamber being disposed between the shock body second end and the piston;
   a third fluid chamber in fluid communication with the first fluid chamber;
   a first outlet through which fluid may pass between the first fluid chamber and the third fluid chamber;
   a fourth fluid chamber in communication with the third fluid chamber having a volume sufficient to accommodate fluid displaced by the shock rod;
   a second outlet through which fluid may pass at least in the direction from the third fluid chamber to the fourth fluid chamber; and
   a third outlet through which fluid may pass at least in the direction from the third fluid chamber to the fourth fluid chamber.

2. The shock absorber of claim 1, further comprising:
   a valve disposed within the first outlet, the first outlet valve being moveable between an opened and a closed position;
   a valve disposed within the second outlet, the second outlet valve being moveable between an opened and a closed position; and
   a valve disposed within the third outlet, the third outlet valve being selectively moveable between an opened position and a closed position.

3. The shock absorber of claim 2, wherein the third outlet valve includes a manually-moveable adjuster.

4. The shock absorber of claim 3, wherein:
   the shock body fluid chamber includes a cylindrical peripheral wall, the reservoir includes a cylindrical peripheral wall disposed around the shock body fluid chamber cylindrical peripheral wall in spaced relation thereto, and the manually moveable adjustment knob extends outwardly from the reservoir cylindrical peripheral wall.

* * * * *